US006138144A

United States Patent [19]
DeSimone et al.

[11] Patent Number: 6,138,144
[45] Date of Patent: *Oct. 24, 2000

[54] METHOD FOR MANAGING MULTICAST ADDRESSES FOR TRANSMITTING AND RECEIVING MULTIMEDIA CONFERENCING INFORMATION ON AN INTERNET PROTOCOL (IP) NETWORK IMPLEMENTED OVER AN ATM NETWORK

[75] Inventors: Antonio DeSimone; Joseph Golan, both of Ocean; Ashok K. Kuthyar, Holmdel; Bryant Richard Parent, Murray Hill; Ram S. Ramamurthy, Manalapan; David Hilton Shur, Middletown, all of N.J.

[73] Assignee: AT&T Corp., New York, N.Y.

[ * ] Notice: This patent issued on a continued prosecution application filed under 37 CFR 1.53(d), and is subject to the twenty year patent term provisions of 35 U.S.C. 154(a)(2).

[21] Appl. No.: 08/881,763

[22] Filed: Jun. 24, 1997

[51] Int. Cl.[7] .................................................. G06F 15/16
[52] U.S. Cl. .......................... 709/204; 709/205; 709/227; 709/229; 709/245
[58] Field of Search .................................... 709/204, 205, 709/227, 229, 245

[56] References Cited

U.S. PATENT DOCUMENTS

| | | |
|---|---|---|
| 5,600,644 | 2/1997 | Chang et al. . |
| 5,694,547 | 12/1997 | Subramanian et al. ............. 395/200.54 |
| 5,758,070 | 5/1998 | Lawrence ................................. 709/220 |
| 5,784,561 | 7/1998 | Bruno et al. ........................ 395/200.34 |
| 5,790,804 | 8/1998 | Osborne ............................. 395/200.75 |
| 5,832,229 | 11/1998 | Tomoda et al. ..................... 395/200.57 |
| 5,835,723 | 11/1998 | Andrews et al. ................... 395/200.56 |

OTHER PUBLICATIONS

Estrin et al., "Multimedia Over IP: Specs Show the Way: A host of protocols could make it possible to send real–time traffic over IP nets", Data Communications, vol.25, No. 10, p.93, Aug. 1996.

Stallings, William, "IPv6: the new netspeak.", LAN Magazine, vol.11, No. 12, p. S24, Nov. 1996.

Anonymous, "White Pine Software: Set to Capture Multicast Video Conferencing Market", M2 Communications, May 1997.

Armitage, Greenville J., "IP Multicasting over ATM Networks" *The Journal on Selected Areas in Communication*, vol. 18, No. 3, Apr. 1997.

Barnes, Jeremy et al., *IP multicast of real–time MPEG over ATM*, Computer Networks and ISDN Systems 28 (1996), pp. 1929–1937.

Symington, Susan F., *Internet Multicast over Asynchronous Transfer Mode*, Proceedings of the Military Communications Conference (Milcom), San Diego, Nov. 6–8, 1995, pp. 262–268.

*Primary Examiner*—Frank J. Asta
*Assistant Examiner*—Almari Romero

[57] ABSTRACT

In a multicast capable IP network implemented over an ATM network, each client terminal on a multimedia conference, for each media type it transmits, is assigned a multicast IP address and a port number (together known as a socket) on which to transmit packets, wherein each assigned multicast IP address is unique and different than the multicast IP address assigned to any other client for any media type. Each client terminal then selects, for each media type, which clients on the conference it wants to receive packets from. Only packets that are in fact requested by a client are routed over the multicast IP network to the requesting client. A single special purpose Multicast Address Resolution System (MARS) server is associated with the conference when the conference is established. Each client terminal uses that MARS server, whether on the same or different IP sub-networks, but on a common ATM network, for purposes of mapping the multicast IP addresses used in the conference into a set of unicast ATM endpoint addresses used by the ATM-connected client terminals. Similarly, when a specific conference uses a Multicast Server, a single special purpose Multicast Server is used for all clients on the conference, whether on the same or different IP sub-networks, for purposes of establishing point-to-multipoint ATM connections to the conference endpoints.

21 Claims, 5 Drawing Sheets

METHOD FOR MANAGING MULTICAST ADDRESSES FOR TRANSMITTING AND RECEIVING MULTIMEDIA CONFERENCING INFORMATION ON AN INTERNET PROTOCOL (IP) NETWORK IMPLEMENTED OVER AN ATM NETWORK

CROSS REFERENCE TO RELATED APPLICATION

This application describes subject matter that is also described in our co-pending United States patent application also assigned to the present assignee hereof: "Transmitting and Receiving Multimedia Conferencing Information on an Internet Protocol (IP) Network", Ser. No. 08/848,456, filed on May 8, 1997.

TECHNICAL FIELD

This invention relates to data communications, and more particularly, to the real-time interactive distribution of multimedia information using the multicast Internet Protocol (IP) which is implemented over an ATM network.

BACKGROUND OF THE INVENTION

Multimedia conferencing systems are typically characterized by the following: a directory service which lists the set of conferences; a dynamic mechanism for keeping track of the members of a conference as they join or leave the conference; tools for generating and processing the audio, video and data sharing components of a conference; a data network for interconnecting the members of a conference; and transport mechanisms for distributing the multimedia conference content among the conference members.

Different transport mechanisms can be used to interconnect participants depending on the underlying capabilities of the data network. Two basic communication capabilities are: unicast communication, meaning a point-to-point communication between a source and a destination endpoint; and multicast communication, meaning that one source endpoint reaches multiple destination endpoints. Since conferencing inherently implies the possibility of more than one destination endpoint, if the network is capable only of unicast communication, then either the source must create multiple unicast connections, or Multicast Servers external to the network must be employed. In the former case, each sender of information sets up multiple connections to every receiver, and replicates the data on each connection. Each receiver has multiple incoming connections, one for every sender of information. This approach becomes inefficient as the number of participants (N) gets large for two reasons. Firstly, the number of network connections is proportional to the square of N. Secondly, each endpoint needs to replicate the data N times, possibly leading to both an excessive and unnecessary use of bandwidth in the network and an excessive amount of computation at the source. If external Multicast Servers are employed, then these servers perform the data replication function. Each sender of information needs to have a single unicast connection to the Multicast Server. Each receiver is connected to the Multicast Server. The number of connections is proportional to N, as all senders share the same set of connections to the set of receivers. The disadvantage of this scheme is that the Multicast Server becomes a bottleneck when N gets large.

When the interconnection network is multicast capable, more efficient alternatives are possible. With multicast service, the source of the information sends the data only once—the replication is handled by the network. It is as if the Multicast Servers described in the previous paragraph are bundled into the network. Efficient techniques for replication may exist in the network. For example, the data replication can be performed in hardware, and the replication function can be distributed over the switches or routers of the network. Furthermore the replication topology may be very efficient, e.g. a spanning tree, where receivers are leafs of the tree, and the data source is the root of the tree. Note that it is also possible to use external Multicast Servers in conjunction with a multicast network. For example, the Multicast Server may be connected to the receivers by multicast mechanisms, and to the sources by unicast mechanisms.

The Internet Protocol (IP) is a widely used transport/networking protocol. In the IP Application Programming Interface (API) (known as IP sockets or WINSOCK), application programs may write data to, or read data from a so-called socket just as if the socket was a "file descriptor" on the local computer. A socket is linked to a pair of numbers, i.e. an IP address and a positive integer referred to as a port number. For sending, the IP address used is the destination address to be placed in the destination field IP packet header, and the port number to be used by the application process on a remote machine for receiving the data. For receiving, the IP address is implicitly the local machine address (or in the case of IP multicast, the multicast group address of interest), and the port number to be used by the application process on the local machine for receiving the data.

Multicast IP, the primary mechanism by which IP networks support multicast, is an emerging capability of the IP protocol. In IP multicast service, unlike the unicast IP service where the address represents a specific and unique end-system, a sender transmits data addressed to an abstraction called a multicast address group. In the prior art, for a given conference, each media-type (e.g., audio, video) is associated with a particular port number and multicast IP address. All receivers for the given media-type listen to the specific socket consisting of the known multicast IP address and port number. All senders for the given media-type send to the specified socket consisting of the same multicast IP address and port number. Among different media-types, a different socket is utilized to enable different application programs to handle the different media of the conference. In prior art systems, the multicast IP address may be the same or different among media types, but the port number is almost always different.

Receivers find out about the existence of multicast groups and port numbers through various (centralized or distributed) directory mechanisms. For example, a well-known multicast IP address may be reserved for directory announcements. Alternatively, a centralized server may contain a list of multicast groups and distribute this list to client terminals upon request. Once the appropriate multicast IP address information has been obtained from the directory mechanism, receivers send messages to Multicast Server processes (e.g., in multicast routers) indicating that they want to join a particular group. The routers then exchange information about the set of users that want to communicate, and build up interconnection trees among themselves. Note that in the prior art, for a given media type, since a common multicast IP address is used by all senders and receivers in a conference, and since the multicast IP address is the atomic unit of routing, this implies that the transmissions of all senders get routed to all receivers, even if each receiver is interested in a (possibly different) subset of the senders. This requires the receiver's application program to receive, process, and discard unwanted information; furthermore the typically expensive network bandwidth required to transport the unwanted information is wasted.

Receivers communicate with multicast routers over some sub-network technology to which both are attached, such as, for example, Ethernet, Frame Relay, or ATM. When IP multicast is supported over a sub-network that has a native multicast ability with a similar service capability to that of IP (e.g., Ethernet), multicast IP addresses may be mapped directly onto Ethernet addresses. Each terminal on the Ethernet then listens for those multicast Ethernet addresses that it is interested in, and ignores the rest.

When IP multicast is supported over a virtual circuit oriented sub-network, such as ATM, that does not have a native multicast capability similar to IP, it is necessary to have an address resolution mechanism to map a multicast IP address into a set of unicast ATM addresses. In the prior art, a Multicast Address Resolution System (MARS) server is utilized for this purpose. When IP receivers want to join an IP multicast group, they send a message to the MARS server. The MARS server then informs all senders to the IP multicast group of the identity of the new receivers. In the prior art, however, a MARS server is only associated with a static set of IP endpoints that are specific to a single sub-network. Thus, if a receiver is a member of a local sub-network, the MARS server specific to that sub-network is used. If conference members are on different sub-networks, one approach of the prior art is to forward multicast IP packets via IP multicast routers connecting the different sub-networks. With respect to the sub-network of which a sender is a member, the multicast router is treated as another receiver by the MARS server of the sender's sub-network. With respect to the sub-networks in which a receiver is a member, the multicast router is treated as a sender by the MARS server of the receiving sub-network. Each sub-network thus requires a separate MARS server and there are no interactions between the plural MARS servers. If it can be assumed that the senders and receivers are attached to a common ATM network, the prior art imposes an extra layer of protocol processing and packet forwarding that introduces additional delays and unnecessary bandwidth utilization. One way of avoiding the use of multicast routers in this context is to allow the MARS servers in the different sub-networks to communicate directly with one another in identifying the ATM addresses of senders and receivers in the different sub-networks. Such multiple MARS servers thus need to communicate with each other for control and coordination purposes, which also requires significant overhead and signaling there between, and the establishment of an inter-server protocol.

SUMMARY OF THE INVENTION

In accordance with the present invention rather than using the fixed plural MARS servers associated with each individual IP sub-network, a single special purpose MARS server is associated with a particular conference at the time the conference is established. All participants of a particular conference, whether on the same or different IP sub-networks, but on a common ATM network, use this same special purpose MARS server for that conference. Thus, the need for communication among either the set of plural MARS servers or multicast routers is eliminated.

When a conference is established, a Directory Server allocates from the then available and unused multicast IP addresses, a set of such addresses to be used for the conference based on the maximum number of expected participants, which number is provided by a conference originator. As each participant joins the conference, the participant's client terminal is assigned a port number and multicast IP address on which to transmit for each media type, wherein the multicast IP address is from the set of multicast IP addresses allocated for use by that conference. In this manner, by choosing to receive on only selected multimedia addresses and port numbers, each client terminal receives transmissions for each media type from only those client terminals it desires.

As it joins the conference, each client is also provided with the ATM address of the single special purpose MARS server assigned for use for that specific conference when the conference was originated. Each client then configures its IP-over-ATM interface to use that specific MARS server for the mapping of the conference multicast IP addresses to ATM addresses. Further, if the specific conference also uses a Multicast Server (MCS), the ATM address of a single special purpose MOS used for the conference is also provided to each client as it joins the conference.

DETAILED DESCRIPTION

Figure 1:
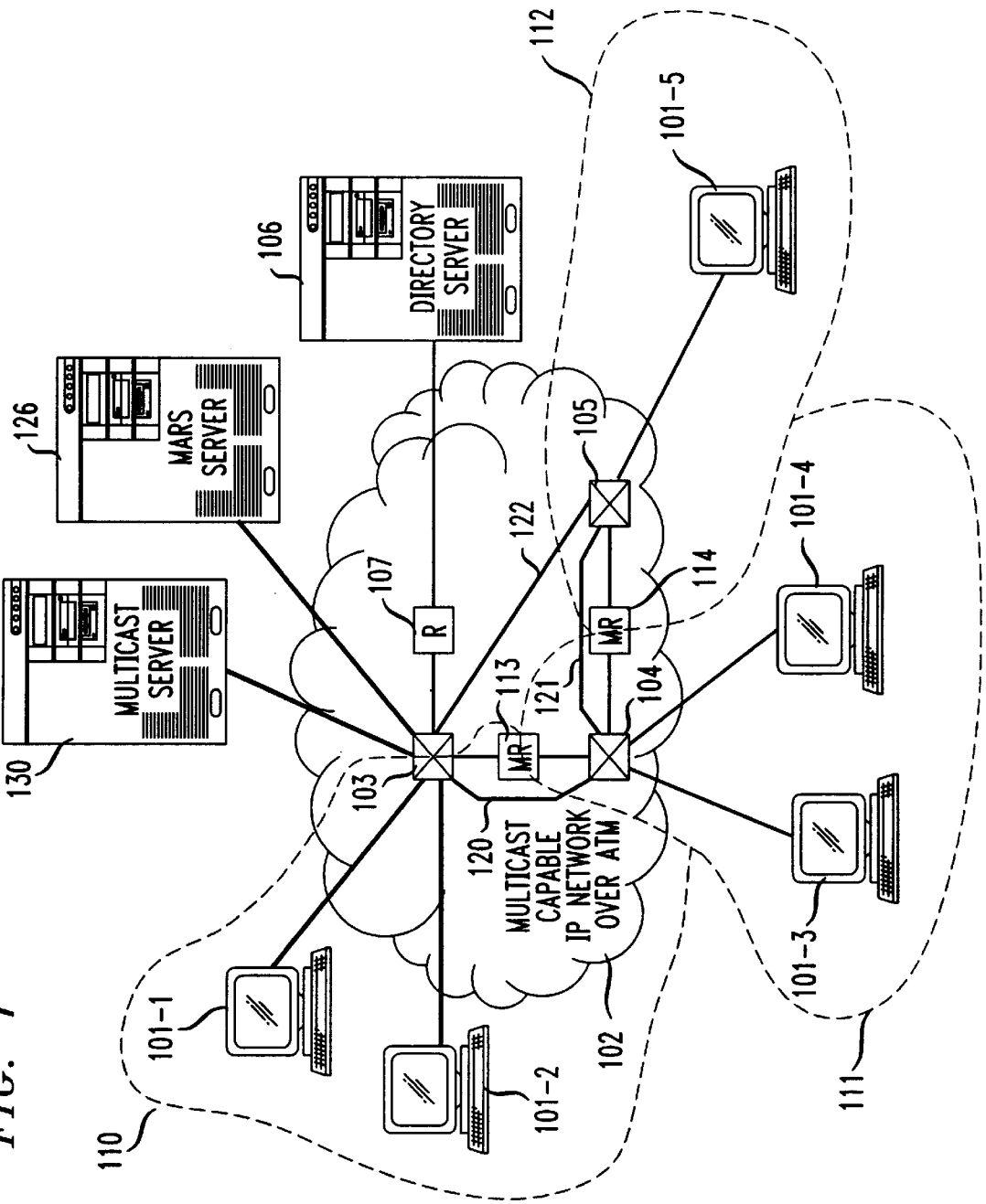
FIG. 1 is a block diagram showing a plurality of client terminals connected to a multicast capable IP network over a common ATM network, to which is also connected a Directory Server for establishing a conference, and a single special purpose MARS server and single special purpose Multicast Server in accordance with the present invention.

With reference to FIG. 1, multimedia client terminals 101-1–101-5 are connected to a multicast capable Internet Protocol (IP) data network 102 implemented over a common ATM network comprising ATM switches 103, 104 and 105, and ATM interconnections 120, 121, and 122. Each of the client terminals 101-1–101-5 is connected to the IP network 102 over ATM. Each client terminal 101-1–101-5 has a unique ATM unicast endpoint address. Network 102 comprises plural IP sub-networks 110, 111, and 112. Thus, as illustrated in FIG. 1, client terminals 101-1 and 101-2 are members of common IP sub-network 110, clients terminals 101-3 and 101-4 are member of IP sub-network 111, and client terminal 101-5 is a member of IP sub-network 112. IP sub-networks 110, 111 and 112 are interconnected through multicast capable IP routers 113 and 114. A Directory Server (DS) 106, which need not operate in a multicast fashion, is connected to the IP network through router 107, which need not be multicast capable.

A single special purpose MARS server 126 is also connected to network 102 through ATM switch 103. The function of this MARS server is, for a particular conference, to maintain the mapping of the particular multicast IP addresses used by that specific conference to the possibly changing set of ATM unicast addresses of the conference client terminals.

Directory Server 106 functions to maintain a list of multicast IP addresses and ports available for use for a plurality of different and possibly concurrent conferences, to assign a subset of those addresses and ports to a particular conference when a conference is initiated, and to assign from that subset a unique multicast IP address and port number to each media type of each client as that client makes a request to become a member of that conference. Once each socket (multicast IP address and port number) is assigned to a particular client for each media type for use during a conference, the assigned multicast IP addresses are marked as being unavailable and cannot be assigned to any other client attempting to join that same conference. Once a participant departs a still ongoing conference, the multicast IP addresses assigned to that participants client are marked as being available and can be assigned to the client of a later joining participant. Directory Server 106 also assigns the ATM address of the special purpose MARS server 126 to be used by the ATM client terminals on the conference.

Upon receiving the set of sockets assigned to it for the conference, the client may decide how it wants to interact in the conference. Specifically, for each media type the client may only want to only receive, or to both receive and transmit, or to just transmit. Further, the client may choose to receive a particular media type from only select other clients on the conference. When a conference is established and a client joins an established conference, therefore, it receives a list of sockets used for transmitting by the other clients associated with the conference. At any time during the conference, it may then receive packets from the other clients in the conference on the sockets assigned for transmission to those other clients, or it may choose not to receive packets of any or all media types from other clients by either not adding the other client's socket(s) to its Multicast Receive Address List (MRAL), or by deleting the other client's socket from its MRAL if it was previously receiving transmissions from the other client. The client then sets its local interface to receive only those packets whose multicast IP addresses/port numbers match the ones in its MRAL. Also, upon receiving the ATM address of the special purpose MARS server 126 assigned to the conference, each client sets up a virtual circuit to this MARS server. During the conference, each client will access this MARS server at its ATM address to map the multicast IP addresses used in the conference to the appropriate set of ATM endpoint addresses.

In FIG. 1, for example, the conference may comprise the client terminals 101-1–101-5. Once the conference is established by the conference originator on Directory Server 106, each client terminal is able to connect to each other client terminal through a combination of queries to MARS server 126, and the setting up of point-to-multipoint virtual circuits via ATM signaling. For example, if client terminals 101-4 and 101-5 each wants to receive the video transmitted by client terminal 101-1, client terminals 101-4 and 101-5 register their ATM unicast addresses with MARS server 126, which then associates those ATM unicast addresses with the multicast IP address that client terminal 101-1 uses for video transmission. When client terminal 101-1 transmits, therefore, it sends the multicast IP address on which it transmits its video to MARS server 126 and receives therefrom the list of ATM unicast addresses to which ATM connections should be established. Client terminal 101-1 then sets up a point-to-multipoint virtual circuit to the ATM addresses of client terminals 101-4 and 101-5. If, during an ongoing conference, client terminal 101-3 decides it also wants to receive the video signal being transmitted by client terminal 101-1, it sends a message to MARS server 126 indicating that it wants to join the multicast group (i.e., receive transmissions destined to the particular multicast IP address to which client terminal 101-1 is transmitting). MARS server 126 then adds the ATM address of client terminal 101-3 to the list of ATM addresses associated with that multicast IP address on which client terminal 101-1 transmits its video signal. Further, MARS server 126 sends an indication to client terminal 101-1 to add client terminal 101-3 to the previously established point-to-multipoint ATM virtual circuit. If, during a conference, one of the clients already receiving the video transmissions from client terminal 101-1 (such as client terminal 101-4) decides that it no longer wishes to receive those transmissions, it then sends a message to MARS server 126 indicating that it wishes to leave the multicast group (i.e., no longer wants to receive transmissions destined to that particular multicast IP address to which client terminal 101-1 is transmitting). MARS server 126 then sends an indication to client terminal 101-1 to remove client 101-4 from the previously established point-to-multipoint ATM virtual circuit.

It has been assumed above that each transmitting client terminal sets up its own point-to-multipoint ATM virtual circuit for each media type to each client terminal that wants to receive that media type. The resulting large number of point-to-multipoint ATM virtual circuits could exhaust switch virtual channel identifier resources. Accordingly, an ATM Multicast Server (MCS) is sometimes employed in a conference in order to share point-to-multipoint connections. Transmitters then set up a unicast point-to-point ATM virtual circuit to the MCS, which in turn establishes a point-to-multipoint ATM virtual circuit to each client terminal desiring to receive transmissions. Thus, all transmitters ultimately share the Multicast Server's point-to-multipoint virtual circuit thereby reducing the demand on ATM switch virtual channel identifier resources. In the prior art multiple of such Multicast Servers may be deployed such that each sub-network has its own Multicast Server. As previously described with respect to per-sub-network prior art MARS servers, inter-sub-network communication between endpoints in different sub-networks requires the use of multicast routers. As before, if it can be assumed that the senders and receivers are attached to a common ATM network, the prior art use of multicast routers imposes an extra layer of protocol processing and packet forwarding that introduces additional delays and unnecessary bandwidth utilization. In accordance with the present invention, if an MCS is used within the conference, the Directory Server also provides each client with the ATM address of a single special purpose Multicast Server for use in that specific conference. Each client then configures its IP-over-ATM interface to use that specific special purpose MCS for all point-to-multipoint ATM communication.

With reference again to FIG. 1, special purpose MCS 130 is shown connected to network 102 through ATM switch 103. For purposes of an example, it can again be assumed that the conference comprises client terminals 101-1–101-5. If client terminals 101-4 and 101-5 each wants to receive the video transmitted by client terminal 101-1, terminals 101-4 and 101-5 register their ATM unicast addresses with MARS server 126, which then associates those ATM unicast addresses with the multicast IP address that client terminal 101-1 uses for transmission. When client terminal 101-1 is ready to transmit, it sets up an ATM virtual circuit to MCS 130. When client terminal 101-1 transmits, it sends the multicast IP address on which it transmits its video to MARS server 126. MARS server 126 then sends the list of ATM unicast addresses to which ATM connections need to be established to MCS 130. MCS 130 then sets up a point-to-multipoint virtual circuit to the ATM addresses of clients 101-4 and 101-5. Client terminal 101-1 then transmits to MCS 130 along the previously established ATM virtual circuit. When a client joins an on-going conference or leaves an ongoing conference, there is a similar interaction between MARS server 126 and MCS 130.

Figure 2:
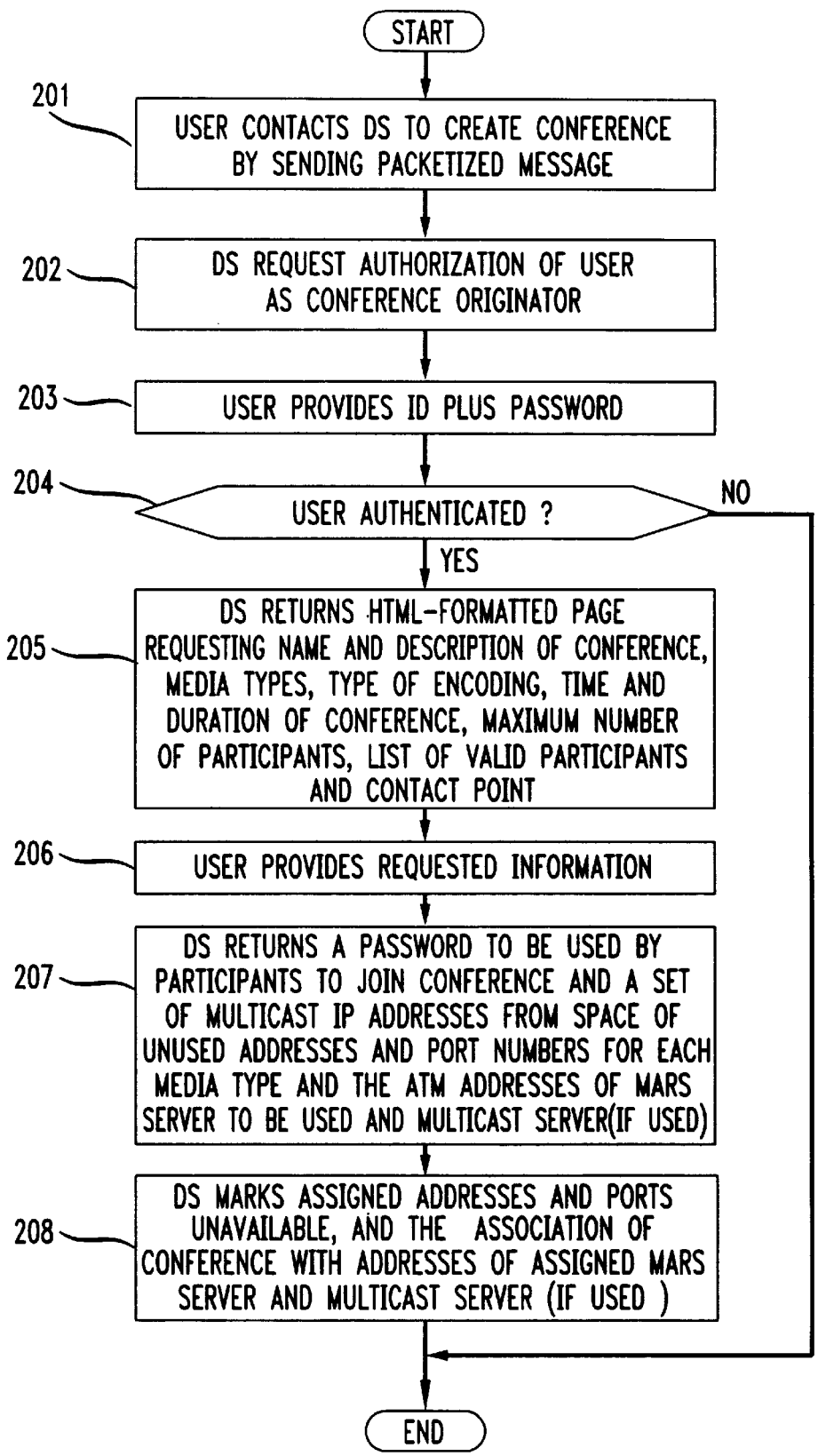
FIG. 2 is a chart illustrating the steps associated with establishing a conference by a conference originator on the network of FIG. 1.

With reference to FIG. 2, the steps to originate a conference by an ATM connected conference originator are detailed. At step 201, by sending a packetized message, a user contacts the Directory Server to create a conference. This could be accomplished by the user clicking on an icon on a browser running on the client, or by the user inputting a particular URL address. At step 202, the Directory Server requests the authorization of the user as a conference originator. At step 203, the user provides his or her ID plus a password. At step 204, if recognized by the DS as an authorized conference originator, the user is authenticated and permitted to proceed to establish the conference. If not, the process ends at step 209. If authenticated, at step 205, the Directory Server returns to the user, for example, an HTML-formatted page requesting information from the originator such as the name and description of the conference, the media types involved with the conference, the types of encoding used by each of the media types, the time at which the conference is scheduled to take place and its expected duration, the maximum number of participants, a list of valid participants, and the name and phone number of a contact point for the proposed conference. The user provides the requested information at step 206. At step 207, the Directory Server returns to the conference originator a password to be used by the participants in order to join the conference and allocates a set of multicast IP addresses and port numbers from the space of available multicast IP addresses and port numbers for each media type. In addition, the ATM address of the particular single special purpose MARS server that will be used for this conference is returned. Further, if a single special purpose Multicast Server is to be used for this specific conference, the ATM address of this MCS is also returned by the Directory Server. At step 208, the Directory Server marks the assigned multicast IP addresses as being unavailable for assignment to any other conference, and the associations of the specific conference with the addresses of the assigned MARS server and the MCS, if the latter is used.

Figure 3:
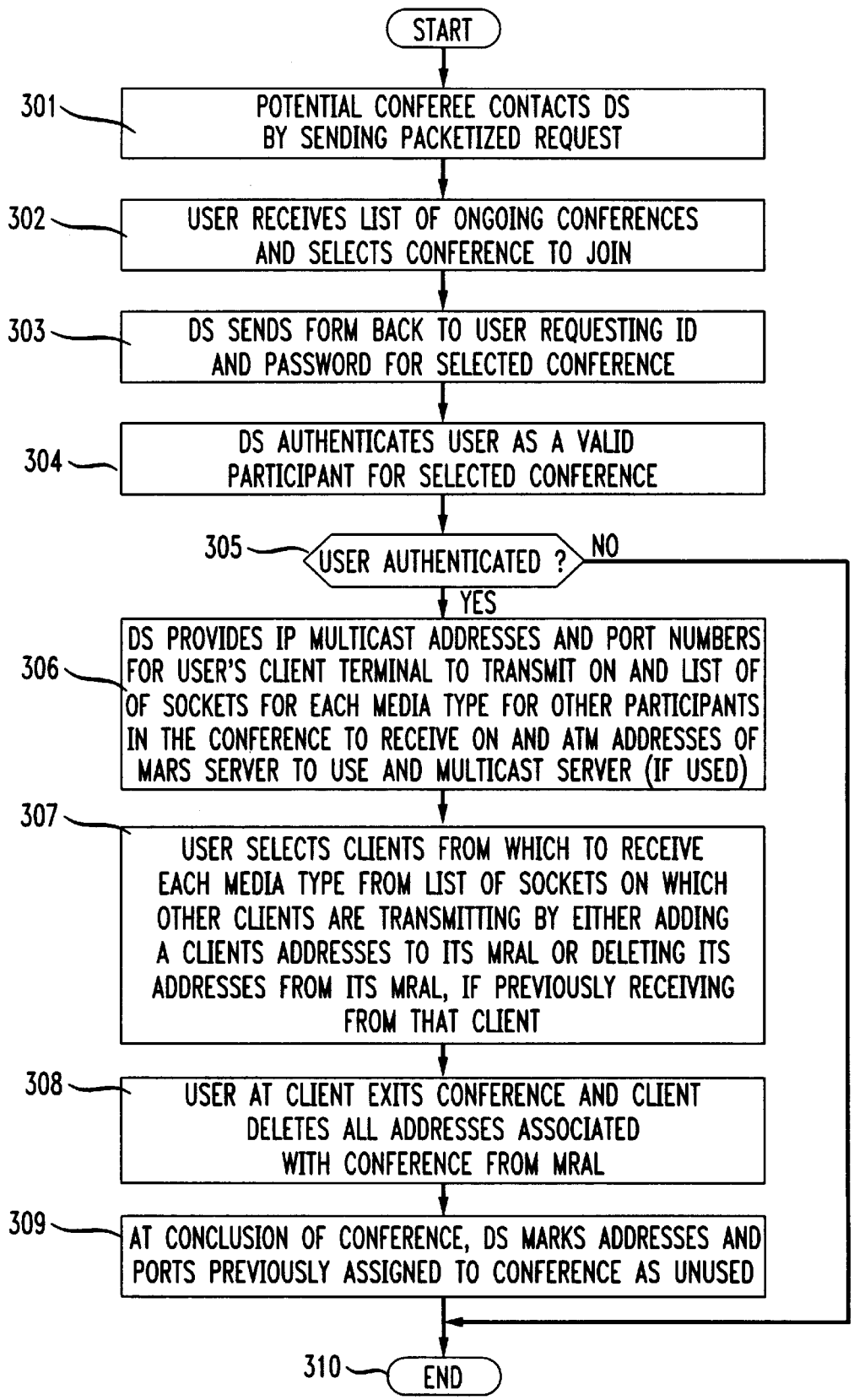
FIG. 3 is a chart illustrating the steps associated with a user joining an already established conference on the network of FIG. 1.

Once the conference originator has established the conference with the Directory Server, users at the client terminals may join the conference within its scheduled time. With reference to FIG. 3, at step 301, a potential ATM connected conferee contacts the DS by sending a packetized request either by clicking on an icon or inputting the URL address of the DS on the client's browser. At step 302, the client receives from the DS a list of ongoing conferences from which the user selects the conference to which he or she then wants to join. At step 303, in response to the selected conference, the DS sends a form back to the user's client requesting the user's ID and the password assigned by the DS to the conference. It is assumed that the password is made available to the conferees by an external system, such as a phone call/message, or encrypted e-mail. The user inputs the requested information and, at step 304, the DS compares the inputted information with its list of valid conference participants as inputted by the conference originator, and the password established for the conference. If the user is not authenticated at step 305, he or she is precluded from joining the conference and the process ends at step 310. If authenticated at step 305, the DS provides at step 306, a multicast IP address and port number for each media type for the client terminal to transmit on and a list of sockets for each media type to receive on for the other client terminals which are participating in the conference and for which the user is a valid recipient. In addition, the DS provides the ATM address of the single special purpose MARS server assigned to the conference and the single special purpose Multicast Server, if the latter is being used. At step 307, the user selects those clients from which to receive each media type from the list of sockets on which the other clients are transmitting. This is done by either adding each such other client's address to its MRAL or deleting such other client's address from its MRAL if it has been previously receiving a currently unwanted media type of transmission from that other client. When a client elects to exit a conference, it deletes all the addresses/ports associated with the conference from its MRAL. When the conference is concluded, the Directory Server, at step 309, marks the addresses and ports assigned to the conference as available so they can be assigned to another conference.

Figure 4:
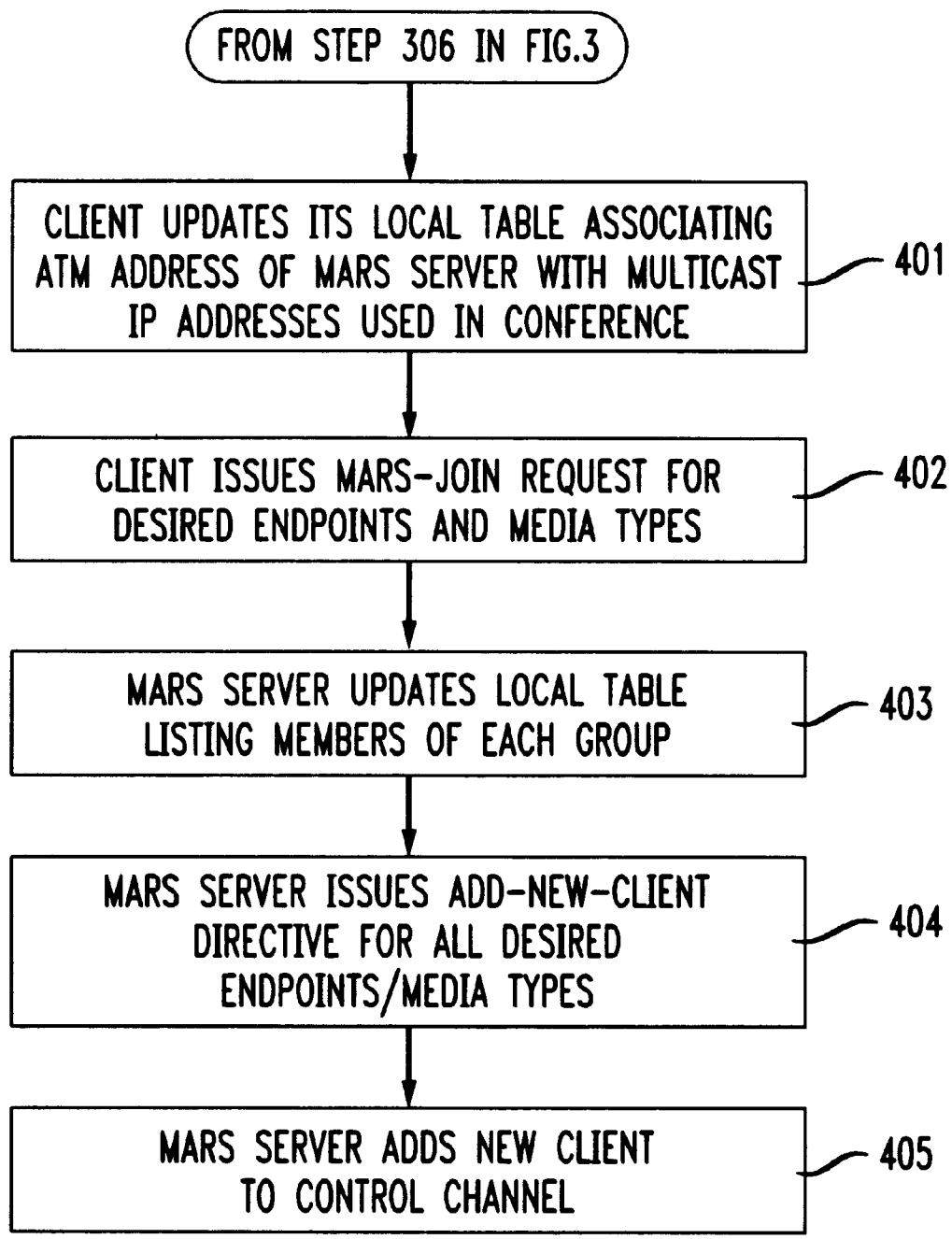
FIG. 4 is a chart illustrating the interactive steps between a client terminal and a single special purpose MARS server when the client terminal joins an existing conference.

FIG. 4 illustrates the interactive steps between a client terminal and the special purpose MARS server when the client terminal wants to join an existing conference for the case where a Multicast Server is not used for the conference. After the client terminal receives from the Directory Server the multicast IP addresses and port numbers on which to receive the other participants' transmissions for which it is a valid receiver, and the ATM address of the special purpose MARS server to be used for the conference (step 306 in FIG. 3), at step 401, the client updates its local MARS table. The local MARS table enables the client to be simultaneously associated with plural conferences. For each conference, the set of associated multicast IP addresses is in turn associated with the ATM address of the MARS server used for that conference. At step 402, for each endpoint and media type from which it wants to receive transmissions on the existing conference that it is joining, the client issues a MARS-JOIN message indicating the multicast IP address/port number associated with that endpoint/media type. At step 403, the special purpose MARS server updates a local table containing the list of ATM endpoints that are members of each IP multicast group to include the requesting client. At step 404, the MARS server then instructs the other transmitting members of the existing conference to add the new client for each media type requested by the client. Each of these other client terminals thus adds the new client as a leaf to its respective distribution tree. The new client, from that point on, can receive all transmissions associated with the multimedia conference which it has selected and for which it has been validated. At step 405, the MARS server adds the new client as a leaf of the control channel, which is the mechanism by which the MARS server sends messages to the members of the conference group. It is through this mechanism that the new client can receive subsequent messages about the existence of new group members or the deletion of existing group members.

Figure 5:
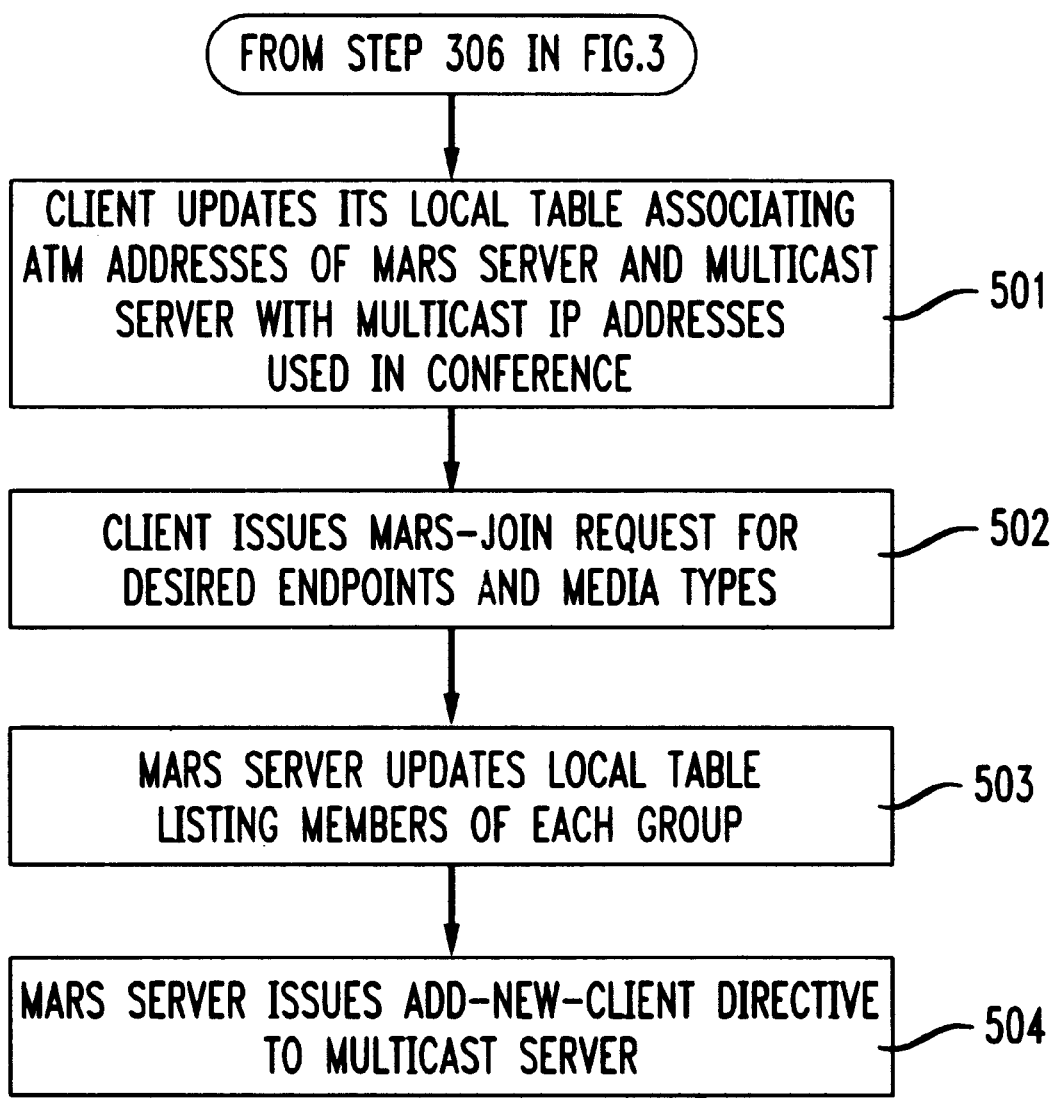
FIG. 5 is a chart illustrating the interactive steps between a client terminal and the special purpose MARS server and a special purpose Multicast Server, when a Multicast Server is also employed in the conference.

FIG. 5 illustrates the interactive steps between a client terminal, the special purpose MARS server and the special purpose Multicast Server when the client terminal wants to join an existing conference for the case where a Multicast Server is used for the conference. In this case, there is little advantage to employing multiple multicast IP addresses for different senders. It can be assumed that for a given media type, a single multicast IP address is used by all senders. As in FIG. 4, the client receives from the Directory Server the multicast IP addresses and port numbers on which to receive the other participants' transmissions for which it is a valid receiver, and the ATM address of the special purpose MARS server to be used for the conference, as well as, for this case, the ATM address of the particular Multicast Server to be used for this conference (from step 306 in FIG. 3). At step 501, the client updates its local table listing the ATM addresses of the MARS servers and Multicast Servers corresponding to the sets of multicast IP addresses for that conference. At step 502, for each media type from which it wants to receive transmissions, the client issues a MARS-JOIN message indicating the multicast IP address/port number associated with that media type. At step 503, the MARS server updates a local table containing the list of ATM endpoints that are members of each IP multicast group. At step 504, the special purpose MARS server then instructs the special purpose Multicast Server to add the new client as a leaf of its distribution tree corresponding to the multicast addresses of the conference. From this point on the new client is able to receive all transmissions associated with the multimedia conference which is has selected and for which it has been validated.

Advantageously, by linking a specific conference to a specific single special purpose MARS server, and, where employed, a singe special purpose Multicast Server, the scalability of the conferencing system is improved. Thus, as a new conference is created, an additional MARS server or MCS can be added for the new conference. Further, by enabling the use of different MARS servers for different conferences, the possibility is eliminated that members of one conference may accidentally get information pertaining to a different conference.

Although described above in the context of IP over ATM networks, the present invention can be applied to other switched virtual circuit technologies such as, for example, IP over ISDN, IP over X.25, and IP over Frame Relay. Further, the network need not have a native point-to-multipoint capability. In such a case, the point-to-multipoint connection would be via the Multicast Server and the connection from the Multicast Server to the endpoints would consist of plural point-to-point connections. Also, the employment of a single special purpose MARS server dedicated to a specific set of IP multicast groups has applicability to any IP Multicast over ATM system, not just multimedia conferencing. Also, although described in connection with a system in which each client is assigned a different multicast IP address on which to transmit, the present invention does not require such arrangement and can be employed in a system which uses a different algorithm for assigning sets of multicast addresses to a given conference.

The above-described embodiment is illustrative of the principles of the present invention. Other embodiments could be devised by those skilled in the art without departing from the spirit and scope of the present invention.

The invention claimed is:

1. In a multicast capable IP network comprising plural IP sub-networks implemented over a common switched virtual circuit in which, during a multimedia conference, at least one of a plurality of clients in the multimedia conference, at an associated unicast endpoint address, transmits packets for multicast transmission to at least some of the plurality of clients in the multimedia conference at their respective unicast endpoint addresses using multicast IP addresses, a method comprising:

assigning a server connected to the network for use during the multimedia conference for managing mapping between the multicast IP addresses, to which said at least one of said plurality of clients transmits packets, and the unicast endpoint addresses of each of the at least some of the plurality of clients receiving such transmitted packets, wherein the packets are packets of plural media types, at least one of the plurality of clients selects one or more of the plural media types that the at least one client chooses to receive from the other of the plurality of clients in the multimedia conference, and wherein only packets of the selected one or more of the plural media types are transmitted to the at least one client; and assigning to each of the plurality of clients in the multimedia conference, for each media type, a different unique multicast IP address on which to transmit packets when each of the plurality of clients joins the multimedia conference.

2. The method of claim 1, wherein the packets of plural media types are transmitted on different multicast IP addresses and the server manages mapping for each media type between the multicast IP address to which said at least one of said plurality of clients transmits packets of that media type and the unicast endpoint addresses of each of the at least some of the plurality of clients receiving transmitted packets of that media type.

3. The method of claim 2 wherein the plural media types are at least one of audio, video and/or data.

4. The method of claim 1 wherein the virtual circuit network is an ATM network, the clients are connected to the ATM network via ATM, and the endpoint addresses are ATM addresses.

5. The method of claim 2, wherein the server maintains for each multicast IP address a set of the unicast endpoint addresses of those clients in the multimedia conference which are currently receiving transmissions on that multicast IP address.

6. The method of claim 1, further comprising:

assigning a special purpose Multicast Server connected to the network for use for that multimedia conference for establishing point-to-multipoint connections to the clients at their unicast endpoint addresses.

7. The method of claim 1, wherein the multicast IP addresses assigned to each of the plurality of clients in the multimedia conference are from a group of multicast IP addresses allocated to the multimedia conference when the multimedia conference is initiated.

8. In a multicast capable IP network comprising plural IP sub-networks implemented over a common switched virtual circuit on which packets are transmitted by a plurality of clients on multicast IP addresses for multicast transmission, a method for a client at a unicast endpoint address to join a multimedia conference and receive transmissions from at least one other client in the multimedia conference at another unicast endpoint address, the method comprising the steps of:

providing to the joining client an endpoint address of a server assigned for use for the conference, which server maintains for each multicast IP address a set of all the unicast endpoint addresses of those clients in the multimedia conference which receive transmissions on the multicast IP address;

receiving a request from the joining client to receive transmissions from the at least one other client; and adding, in the server, the unicast endpoint address of the joining client to a group of endpoint addresses associated with the particular multicast IP address on which the at least one other client transmits, wherein the transmissions are transmissions of plural media types, each media type is assigned a different multicast IP address for each of the plurality of clients, and wherein the multicast IP addresses are assigned from a group of multicast IP addresses allocated to the multimedia conference when the multimedia conference is initiated.

9. The method of claim 8 further comprising the step of instructing the at least one other client to add the joining client as an additional endpoint on a point-to-multipoint virtual circuit to the group of endpoint addresses to which the at least one other client transmits on the particular multicast IP address.

10. The method of claim 8, wherein the transmissions include packets of plural media types transmitted by the at least one other client on different multicast IP addresses, and the request from the joining client includes a request to receive transmissions from the at least one other client of packets of at least one of the plural media types.

11. The method of claim 10 wherein the plural media types are at least one of audio, video and/or data.

12. The method of claim 10, further comprising:
assigning to the joining client, for each media type for which packets are transmitted, a multicast IP address on which to transmit such packets that is different and unique from any multicast IP address assigned to any other client in the multimedia conference.

13. The method of claim 12, wherein the multicast IP addresses assigned to the joining client are from a group of multicast IP addresses allocated to the multimedia conference.

14. The method of claim 8 wherein the virtual circuit network is an ATM network, the joining client and the other clients are connected to the ATM network via ATM, and the unicast endpoint addresses are ATM addresses.

15. The method of claim 8, further comprising:
providing, to the joining client, an endpoint address of a single special purpose Multicast Server assigned for use during the multimedia conference, which Multicast Server establishes point-to-multipoint connections to clients in the multimedia conference;
establishing a virtual connection between the joining client and the special purpose Multicast Server;
providing the endpoint address of the joining client to the Multicast Server; and
adding the endpoint address of the joining client to the Multicast Server's point-to-multipoint connections.

16. In a multicast capable IP network comprising plural IP sub-networks implemented over a common switched virtual circuit in which, during a multimedia conference, at least one of a plurality of clients in the multimedia conference, at an associated unicast endpoint address, transmits packets for multicast transmission to at least some of the plurality of clients in the multimedia conference at their respective unicast endpoint addresses using multicast IP addresses, a method comprising:
assigning a server connected to the network for use during the multimedia conference for managing mapping between the multicast IP addresses, to which said at least one of said plurality of clients transmits packets, and the unicast endpoint addresses of each of the at least some of the plurality of clients receiving such transmitted packets, wherein
the packets are packets of plural media types, at least one of the plurality of clients selects one or more of the plural media types that the at least one client chooses to receive from the other of the plurality of clients in the multimedia conference, and wherein only packets of the selected one or more of the plural media types are transmitted to the at least one client;
identifying a maximum number of clients for the multimedia conference; and
pre-assigning a fixed number of multicast IP addresses to the multimedia conference based on the identified maximum number of clients.

17. The method of claim 16, further comprising:
assigning a subset of the fixed number of multicast IP addresses to one of the plurality of clients when the one of the plurality of clients joins the multimedia conference, the subset of the fixed number of multicast IP addresses including an multicast IP address for each media type.

18. In a multicast capable IP network comprising plural IP sub-networks implemented over a common switched virtual circuit in which, during a multimedia conference, at least one of a plurality of clients in the multimedia conference, at an associated unicast endpoint address, transmits packets for multicast transmission to at least some of the plurality of clients in the multimedia conference at their respective unicast endpoint addresses using multicast IP addresses, a method comprising:
assigning a server connected to the network for use during the multimedia conference for managing mapping between the multicast IP addresses, to which said at least one of said plurality of clients transmits packets, and the unicast endpoint addresses of each of the at least some of the plurality of clients receiving such transmitted packets, wherein
the packets are packets of plural media types, at least one of the plurality of clients selects one or more of the plural media types that the at least one client chooses to receive from the other of the plurality of clients in the multimedia conference, and wherein only packets of the selected one or more of the plural media types are transmitted to the at least one client and the at least one client may choose to receive packets of different media types from different ones of the other clients of the plurality of clients.

19. The method of claim 18, wherein the multicast IP addresses for the other clients of the plurality of clients corresponding to the selected media types, are added to an address list associated with the at least one client.

20. The method of claim 18, wherein the server instructs the other clients of the plurality of clients to add a multicast IP address for the at least one client to distribution trees associated with the other clients.

21. The method of claim 18, further comprising:
identifying a maximum number of clients for the multimedia conference; and
pre-assigning a fixed number of multicast IP addresses to the multimedia conference based on the identified maximum number of clients.

* * * * *